US011882880B2

(12) United States Patent
Schmidlin et al.

(10) Patent No.: US 11,882,880 B2
(45) Date of Patent: Jan. 30, 2024

(54) ELECTRONIC CIGARETTE WITH OPTICAL VAPORISATION SYSTEM

(71) Applicant: JT International S.A., Geneva (CH)

(72) Inventors: Moritz Schmidlin, Dietikon (CH); Damir Luso, Schlieren (CH)

(73) Assignee: JT International S.A.

( * ) Notice: Subject to any disclaimer, the term of this patent is extended or adjusted under 35 U.S.C. 154(b) by 648 days.

(21) Appl. No.: 16/973,641

(22) PCT Filed: Jun. 13, 2019

(86) PCT No.: PCT/EP2019/065543
§ 371 (c)(1),
(2) Date: Dec. 9, 2020

(87) PCT Pub. No.: WO2020/001997
PCT Pub. Date: Jan. 2, 2020

(65) Prior Publication Data
US 2021/0251291 A1 Aug. 19, 2021

(30) Foreign Application Priority Data
Jun. 26, 2018 (EP) .................................... 18179731

(51) Int. Cl.
*A24F 40/46* (2020.01)
*A24F 40/53* (2020.01)
(Continued)

(52) U.S. Cl.
CPC .............. *A24F 40/46* (2020.01); *A24F 40/42* (2020.01); *A24F 40/51* (2020.01); *A24F 40/53* (2020.01); *H05B 1/0297* (2013.01); *A24F 40/10* (2020.01)

(58) Field of Classification Search
CPC .......... A24F 40/46; A24F 40/42; A24F 40/51; A24F 40/53; A24F 40/10; A24F 40/60; H05B 1/0297
See application file for complete search history.

(56) References Cited

U.S. PATENT DOCUMENTS

2018/0098572 A1 4/2018 Minskoff et al.
2018/0177231 A1* 6/2018 Woodbine .............. A24F 40/53
(Continued)

FOREIGN PATENT DOCUMENTS

CN 203646497 U 6/2014
CN 104643290 A 5/2015
(Continued)

OTHER PUBLICATIONS

Extended European Search Report including Written Opinion for Application No. EP18179731.7, dated Dec. 11, 2018, pp. 1-7.
(Continued)

*Primary Examiner* — Truc T Nguyen
(74) *Attorney, Agent, or Firm* — Lerner David LLP

(57) ABSTRACT

An electronic cigarette includes a main body and a replaceable cartridge that can be disassembled from the main body. The main body includes a laser. The cartridge includes a liquid store and an absorber configured to be heated by radiation emitted by the laser in order to vaporise a vaporisable medium. An enabling device is also provided to enable propagation of radiation from the laser to the absorber when the cartridge is assembled to the main body and to inhibit propagation of radiation from the laser to the absorber when the cartridge is disassembled from the main body.

16 Claims, 7 Drawing Sheets

(51) Int. Cl.

| | |
|---|---|
| ***A24F 40/42*** | (2020.01) |
| ***A24F 40/51*** | (2020.01) |
| ***H05B 1/02*** | (2006.01) |
| *A24F 40/10* | (2020.01) |

(56) References Cited

U.S. PATENT DOCUMENTS

| | | | | |
|---|---|---|---|---|
| 2019/0142071 | A1 | 5/2019 | Seok | |
| 2019/0200674 | A1* | 7/2019 | Tucker | F21V 33/0004 |
| 2020/0029619 | A1* | 1/2020 | Sundberg | A24F 40/10 |
| 2023/0285780 | A1* | 9/2023 | Phillips-Reyes | A62B 18/003 128/200.14 |
| 2023/0288773 | A1* | 9/2023 | Abdollahramezani | G02F 1/19 359/240 |

FOREIGN PATENT DOCUMENTS

| | | | |
|---|---|---|---|
| KR | 20160134582 | A | 11/2016 |
| KR | 20180008332 | A | 1/2018 |
| WO | 2016184783 | A1 | 11/2016 |
| WO | 2017182554 | A1 | 10/2017 |
| WO | 2018109611 | A1 | 6/2018 |

OTHER PUBLICATIONS

International Search Report including Written Opinion for Application No. PCT/EP2019/065543, dated Sep. 23, 2019, pp. 1-12.

* cited by examiner

ELECTRONIC CIGARETTE WITH OPTICAL VAPORISATION SYSTEM

CROSS-REFERENCE TO RELATED APPLICATIONS

The present application is a national phase entry under 35 U.S.C. § 371 of International Application No. PCT/EP2019/065543, filed Jun. 13, 2019, published in English, which claims priority to European Application No. 18179731.7 filed Jun. 26, 2018, the disclosures of which are incorporated herein by reference.

FIELD OF INVENTION

The present invention relates to a modular electronic cigarette in which a vaporisable liquid is vaporised using a light source such as a laser. The modular electronic cigarette includes a main body and a cartridge having a liquid store for vaporisable liquid. The cartridge can be disassembled from the main body and replaced.

BACKGROUND

Electronic cigarettes are becoming increasingly popular consumer devices. Some electronic cigarettes are configured to vaporise a liquid from a liquid store by using a vaporiser comprising a heater and a wick. A flow path is provided from the liquid reservoir to a vaporiser, which is sometimes referred to as an atomiser. Often an atomiser is provided with an absorber that can absorb liquid from the reservoir and a heating coil that can vaporise the liquid that is received in the absorber. The heater is often in the form of a heating coil which is provided as an electrically resistive wire wrapped around the absorber.

Another technique for vaporising liquid involves the use of lasers. One technique for this is described in WO 2017/182554. In this arrangement a laser emitter projects light into a light guide that couples light towards a target. The target in this example includes a number of absorbers that extend into a liquid reservoir.

SUMMARY

There is a need for providing enhanced safety in vaporisers using lasers such that the user's potential exposure to the laser radiation is avoided or reduced.

An object of the present invention is to address and overcome some of these issues.

According to an aspect of the present invention there is provided an electronic cigarette comprising: a main body comprising a vaporising light source; a cartridge configured to be removably assembled to the main body, wherein the cartridge includes a liquid store for storing a vaporisable medium and an absorber configured to be heated by radiation emitted by the vaporising light source in order to vaporise the vaporisable medium; and an enabling device adapted to enable propagation of radiation from the vaporising light source to the absorber only when the cartridge is assembled to the main body, such that the light source cannot propagate light outside the electronic cigarette when the cartridge is disassembled from the main body, and wherein the enabling device comprises a light guide connected to the cartridge, wherein, when the main body and the cartridge are assembled together the light guide is positioned to direct radiation emitted by the vaporising light source towards the absorber.

In this way, the safety of the electronic cigarette is improved. This is achieved because a user is protected from radiation emitted by the vaporising light source when disassembling the cartridge from the main body. Preferably the enabling device is configured to inhibit propagation of radiation from the vaporising light source to the absorber when the cartridge is disassembled from the main body. The cartridge can be assembled to the main body using a snap lock, a bayonet-fit, a threaded connection or a magnetic coupling, in just a few examples.

A flow path is preferably provided for the vaporisable liquid to flow from the liquid store towards the absorber. The vaporisable liquid can receive heat from the absorber when it is heated by the vaporisable light source so that it can vaporise for inhalation by a user.

As explained, the enabling device comprises a light guide connected to the cartridge. When the main body and the cartridge are assembled together the light guide is preferably positioned to direct radiation emitted by the vaporising light source towards the absorber. When the cartridge is disassembled from the main body the absence of the light guide preferably means that light from the vaporising light source is not directed towards the absorber. In this way, assembly of the main body to the cartridge can provide the light guide in a position that allows it to capture radiation emitted by the vaporising light source and re-direct it towards the absorber. This creates a mechanical protection arrangement which geometrically prevents the vaporising light from propagating outside the main body when the cartridge is disconnected from the main body. This arrangement can be used together with other enabling devices. This has the advantage that the other enabling devices can electrically enable and disable the light source, whereas the light guide can creates a reliable arrangement as an additional safety enhancement. A beam dump may be provided for receiving radiation emitted by the vaporising light source in the absence of the light guide when the first and cartridges are disassembled.

The vaporising light source may be oriented away from the absorber and the light guide may comprise a surface that reflects radiation emitted by the vaporising light source towards the absorber. In one arrangement the vaporising light source may be oriented in order to emit radiation in a direction that is transverse to the longitudinal axis of the electronic cigarette. The vaporising light source is preferably oriented so that its emitted light does not escape the main body when the cartridge is disassembled from it. The light guide can reflect the emitted radiation through an angle such as 90° so that the reflected radiation propagates in a direction that is parallel to the longitudinal axis, towards the absorber.

In another embodiment the enabling device comprises a sensor, mounted in the main body, configured to detect the presence of the cartridge when it is assembled to the main body. The enabling device can include control electronics configured to enable or inhibit emission of radiation by the vaporising light source based on a signal received from the sensor. This provides an electronic lock for the vaporising light source and prevents it from emitting any radiation when the main body and the cartridge are disassembled. This advantageously improves safety in a modular electronic cigarette. Thus, a two-step control process may be provided to enable propagation of radiation fro the vaporising light source towards the absorber. First, the light guide may be required to provide a geometric light path. Second, the sensor can electronically control emission of vaporising radiation, only when it is detected that the cartridge has been correctly assembled to the main body.

The cartridge may comprise encoded authentication information that can be read by the sensor when the cartridge is assembled to the main body. The control electronics may be configured to authenticate the encoded authentication information thereby to enable or inhibit emission of radiation by the vaporising light source. If the authentication information is valid then the vaporising light source can be enabled for normal use. On the other hand, if the authentication information is not valid then authentication process may fail and emission of radiation by the vaporising light source can be inhibited. This can happen even though the cartridge has been successfully assembled to the main body to ensure that the main body is only used with authentic cartridges, as verified by the detection of appropriate authentication information. This can provide a consumer with protection against counterfeit products.

The encoded authentication information may be stored in one of: an optical code and a microchip. In one example the encoded information may be stored in a RFID chip which can be read by a RFID sensor in the main body. In another example electrical contacts may be provided in the main body that can extract the encoded information from a microchip in the cartridge. In another example an optical code may be provided as a barcode or a QR code.

The sensor may be an optical sensor configured to detect the presence or absence of the cartridge. An optical code can be provided whereby the presence of light from a LED or other emitter can be captured by a sensor only when the cartridge is connected to the main body.

The main body may include a sensing light source and a light detector. Light emitted by the sensing light source may be directed towards the light detector when the cartridge is assembled to the main body. In one example, the sensor may be exposed to ambient light when the cartridge is disassembled and this may be detected in order to inhibit operation of the vaporisable light source. On the other hand, the sensor may be covered when the cartridge is assembled to the main body and the absence of any detected light may be detected in order to enable emission of radiation by the vaporising light source.

In one embodiment a mirror may be provided on the cartridge that can reflect light emitted by the sensing light source towards the light detector. This can reliably indicate whether the cartridge is assembled to the main body or disassembled from the main body. The light detector may be a photodiode in some embodiments. Preferably the sensing light source has different properties to the vaporising light source. For example, the sensing light source may be a LED operating at visible wavelengths whereas the vaporising light source may be a laser that operates at infra-red wavelengths.

In one embodiment the sensor is a Hall Effect sensor configured to detect the presence or absence of a magnet in the cartridge. In other embodiments the sensor is one of a capacitive sensor or an antenna, configured to detect the presence or absence of a corresponding component on the cartridge.

In one example the antenna may be configured to detect the presence or absence of a contactless chip such as a RFID chip in the cartridge. The capacitive sensor may be configured as a proximity sensor configured to detect the proximity of a metal or dielectric component in the cartridge, based on a change in a sensed electric field in the vicinity of the capacitive sensor.

The sensor may comprise an electrical circuit which is rendered open or closed depending on whether the main body is assembled to the cartridge or disassembled from the cartridge. For example, the sensor may comprise an electrical switch. The electrical switch may be formed between two contacts on the main body, and the two contacts may be electrically connected by a conductor on the cartridge when the cartridge is assembled to the main body. Alternatively, a switch may be closed when the cartridge is disassembled from the main body, and opened when the cartridge is assembled to the main body.

In one arrangement the absorber may form part of the electrical circuit when the cartridge is assembled to the main body. In this way, the current flowing in the electrical circuit may be monitored and may be indicative of the amount of liquid in the absorber. This may be used as an indirect sensor for measuring the amount of liquid remaining in the liquid store.

The electrical circuit may also include a temperature sensing element that can monitor the temperature of the absorber. This can be used to control the amount of heating provided by the vaporising light source and to prevent over heating or burning of the absorber. This may also provide indirect measurement of the amount of liquid remaining in the liquid store since over heating may be indicative of an absence of cooling effect that would normally be provided by the vaporisable liquid.

In one embodiment the enabling device comprises a gate positioned in the main body. The gate may be configured to open when the cartridge is assembled to the main body and to close when the cartridge is disassembled from the main body. The closed gate may be positioned in order to block propagation of radiation from the vaporising light source to the absorber.

The gate may be configured to be opened by the light guide in the cartridge. The gate can therefore provide an optical shield that prevents light propagating from the vaporising light source towards the absorber. The gate is preferably mechanically operable.

The light guide and/or the gate may have a tapered edge, causing the gate to move laterally when the light guide is moved past the gate in a longitudinal direction (with respect to the longitudinal axis of the electronic cigarette). The gate is preferably biased towards the closed position. This may be achieved by providing a spring, such as a leaf spring.

The cartridge is preferably a removable cartridge. A spent cartridge may be disconnected and replaced by a fresh cartridge. The main body may be a main part of an electronic cigarette, which is not intended to be replaced.

The cartridge preferably comprises a mouthpiece which is connected to an airflow channel. A user may be able to inhale vaporised liquid through the mouthpiece in the cartridge when the vaporisable liquid is vaporised by the vaporisable light source.

A sensor may be provided in the cartridge in order to detect the volume of liquid remaining in the liquid store. The sensor may be connected to control electronics in the main body so that emission of light by the vaporising light source can be inhibited when the liquid store is depleted. This can prevent the vaporising light source from excessively heating, and potentially burning, a dry absorber.

The vaporisable light source is preferably a laser. A laser can provide a light beam with a specific wavelength that is well suited to vaporising a liquid. The laser may be a laser diode configured to emit at an infra-red wavelength. In one alternative the vaporisable light source may be a high-power LED.

A two-step enabling process can be provided within the scope of the present invention. The enabling device includes a light guide which can optically or mechanically enable propagation of radiation from the vaporising light source towards the absorber. This can create a "fail-safe" mechanical protection arrangement. This arrangement geometrically avoids the vaporising light from illuminating objects outside the main body when the cartridge is disconnected from the main body. Advantageously, as also indicated by the dependencies of the claims, this arrangement can be used together with enabling devices according to other embodiments of the present electronic cigarette. Hence, a second enabling device can be configured to prevent illumination by electrically enabling and disabling the light source. That is the second enabling device is configured to enable the light source when the cartridge is connected to the main body and to disable the light source when the cartridge is disconnected from the main body.

This has the advantage that the other enabling devices can electrically enable and disable the light source, whereas the light guide creates a fail-safe arrangement as an additional safety enhancement. By electrically enabling the light source with the second enabling device, power can also be saved by avoiding illumination when the cartridge is disconnected.

According to another aspect of the invention there is provided a method of assembling an electronic cigarette having a main body comprising a vaporising light source and a cartridge including an absorber configured to be heated by radiation emitted by the vaporising light source in order to vaporise a vaporisable medium, comprising the steps of: assembling the cartridge to the main body; enabling propagation of radiation from the vaporising light source to the absorber when the cartridge is assembled to the main body; and inhibiting propagation of radiation from the vaporising light source to the absorber when the cartridge is disassembled from the main body.

According to another aspect of the invention there is provided a method of disassembling an electronic cigarette comprising the step of disassembling the cartridge from the main body.

According to yet another aspect of the invention there is provided a cartridge for use in an electronic cigarette comprising: a liquid store; an absorber configured to be heated by radiation emitted by a vaporising light source in a main body of the electronic cigarette in order to vaporise a vaporisable medium; and an enabling device adapted to enable propagation of radiation from the vaporising light source to the absorber when the cartridge is assembled to the main body and to inhibit propagation of radiation from the vaporising light source to the absorber when the cartridge is disassembled from the main body. The enabling device is a light guide having a light input surface optically coupled with a light emitter and an output surface optically coupled with the absorber. The light input surface preferably has a tapered angle.

According to yet another aspect of the invention there is provided an electronic cigarette main body comprising: a vaporising light source configured to emit radiation towards an absorber in a cartridge in order to vaporise a vaporisable medium; and an enabling device adapted to enable propagation of radiation from the vaporising light source to the absorber when the cartridge is assembled to the main body and to inhibit propagation of radiation from the vaporising light source to the absorber when the cartridge is disassembled from the main body.

BRIEF DESCRIPTION OF THE DRAWINGS

Embodiments of the invention are now described, by way of example, with reference to the drawings, in which.

DETAILED DESCRIPTION

As used herein, the term "inhaler" or "electronic cigarette" may include an electronic cigarette configured to deliver an aerosol to a user, including an aerosol for smoking. An aerosol for smoking may refer to an aerosol with particle sizes of 0.5-7 microns. The particle size may be less than 10 or 7 microns. The electronic cigarette may be portable.

Figure 1:
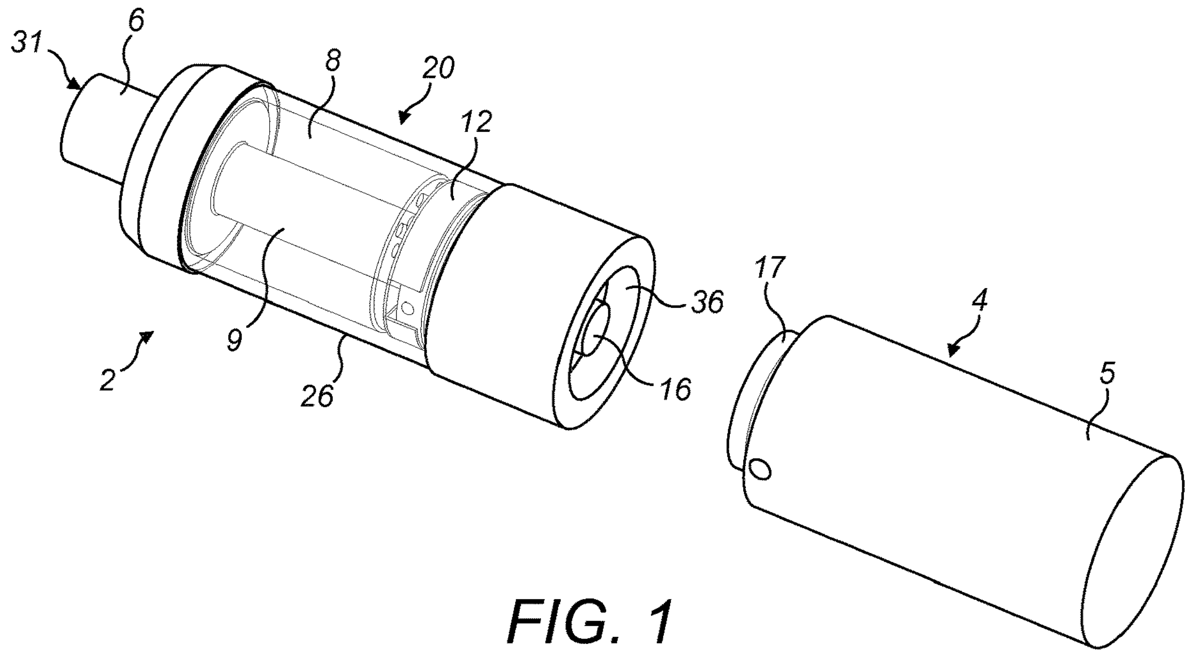
FIG. 1 is an exploded view of an electronic cigarette in an embodiment of the invention.

With reference to FIG. 1, an electronic cigarette 2 is illustrated. The electronic cigarette 2 can be used as a substitute for a conventional cigarette comprising shredded tobacco. As seen in the figures, the electronic cigarette 2 is provided with an elongate main body 4. A replaceable cartridge 20 is arranged to be connectable to a distal portion of the main body 4. Hence, the cartridge 20 can be configured as a disposable unit whereas the main body 4 is configured to be reusable.

The cartridge 20 comprises a mouthpiece 6 and a reservoir 8 for storing vaporisable liquid. The vaporisable liquid may comprise propylene glycol or glycerin, which is able to produce a visible vapor. The vaporisable liquid may further comprise other substances such as nicotine and flavorings. The reservoir 8 may have an annular shape, formed around a central airflow bore 9 that extends from a vaporization chamber 12 to the mouthpiece 6. The mouthpiece 6 has a vapour outlet 31 and may have a tip-shaped form to correspond to the ergonomics of the user's mouth.

The main body 4 of the electronic cigarette 2 includes a power source 5, such as a battery, electronic control circuitry and a vaporising light source 14. The light source 14 can for instance be a laser 14 or a high power LED. The light source 14 is electrically connected to the battery 5. In an embodiment, laser diodes may be provided. These are chosen because they can provide high efficiency within a compact size. Typical wavelengths for the emitted light range from 785 nm to 1064 nm. Multimode lasers are preferred because they can provide a higher power output and are typically available at a lower cost. However, single mode lasers could also be used.

As an alternative to a laser it is possible to use a light emitting diode (LED). High power LEDs are known at near infra-red (850 nm) and ultraviolet (405 nm). LEDs typically require the addition of optical components for beam shaping to deal with their wide emission angles in comparison to lasers.

The cartridge 20 is arranged to be replaceable within the electronic cigarette 2. In use, a projection 17 on the main body 4 is adapted to be received within a receiving portion 36 in the cartridge 20. The cartridge 20 can be assembled to the main body 4 using a snap lock, a bayonet-fit, a threaded connection or a magnetic coupling, in just a few examples.

The replaceable cartridge 20 has an external housing 26 preferably made as a unitary component. The material of the housing 26 may for instance be metal, glass or plastic that is easy to shape as a single unit. The external housing 26 generally has a transparent portion to allow a user to see the amount of liquid remaining in the reservoir 8.

The receiving portion 36 in the cartridge 20 is configured to receive the main body projection 17. The receiving portion 36 has a shape that preferably corresponds to the circumferential shape of the projection 17. The projection 17 can be held snugly within the receiving portion 36 by a friction fit. Alternatively, a screw fit between the projection 17 and the receiving portion 36 can provide a fixed attachment therebetween.

The projection 17 is sealed against an inner surface of the receiving portion 36. A seal (not shown) prevents liquid leaking along the atomizer housing 26. At least one annular seal can be provided on the inner circumference of the receiving portion 36. The annular seal can be provided as at least one O-ring.

As seen in FIGS. 2 to 8, the electronic cigarette 2 further comprises an enabling device adapted to enable propagation of radiation from the vaporising light source 14 to the absorber 10 only when the cartridge 20 is assembled to the main body 4.

As seen in FIGS. 2, 3*b*, 4*b*, 5*b*, 6*b*, 7*b* and 8, the enabling device comprises a light guide 16 configured to couple the light from the light source 14 to the absorber 10. As seen in all figures except FIG. 8, the light source, (which is a laser 14), only transmits light in the axial direction of the electronic cigarette 2 when the cartridge and main body 4 are connected to each other. In the embodiment illustrated in FIG. 8, the enabling device also comprises a light guide 16, but the light source 14 can transmit light in the axial direction of the electronic cigarette 2. However, a separate gate 64 is provided. The gate 64 can act as a shield to avoid transmitting light when the cartridge 20 is not connected.

Figure 2:
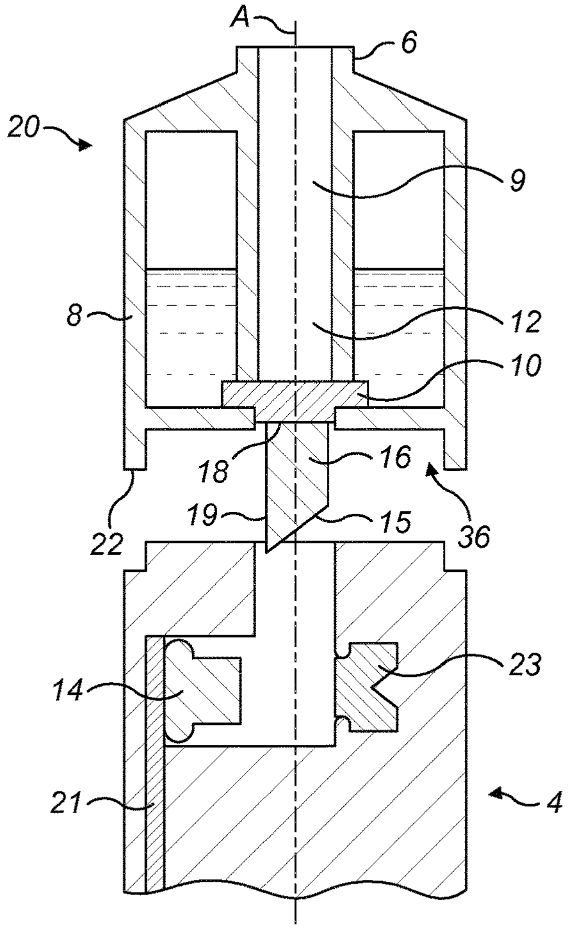
FIG. 2 is a cross-sectional view of a cartridge and a main body of an electronic cigarette in an embodiment of the invention.

As seen in FIG. 2, the enabling device can comprise solely a light guide 16 configured to receive incoming light from the light source 14 in a horizontal direction and can reflect the light in the axial direction of the light guide 16 towards the absorber 10. In addition to the light guide 16 or alternatively, as seen in FIGS. 3-7, the enabling device can comprise an authentication or switch device which is configured to electrically disable the vaporising light source 14 when the cartridge 20 is disassembled from the main body 4.

With reference to FIG. 2, the cartridge 20 includes a vaporization chamber 12 which is fluidically connected to the reservoir 8. Liquid in the reservoir 8 can flow towards an absorber 10. In this example embodiment the absorber 10 is partially located within the reservoir 8, but it may be provided separately and fluidically connected by liquid channels. The vaporisable liquid may be arranged to flow towards the absorber 10 by capillary effects. Gravity may also encourage the flow of vaporisable liquid and/or a pump (not shown) may be present.

The absorber 10 is provided within a vaporisation chamber 12 above an end face 18 of a light guide 16. The absorber 10 can perform two independent functions in this arrangement. First, the absorber 10 can absorb the liquid from the reservoir 8. Second, the absorber 10 can absorb radiation emitted by the laser 14 so that the material of the absorber 10 is heated. Heat can be transferred from the absorber 10 to the vaporisable liquid so that it is vaporised. An absorber 10 such as a metal mesh or a porous metal disk may be provided with light absorption properties, but without liquid absorption properties.

The cartridge 20 further comprises air channels extending between air inlets and air outlets located in the vaporization chamber 12. Preferably, the at least one air outlet in the vaporization chamber 12 is located above the absorber 10. Air inlets (not shown) are provided and the vapour outlet 31 is provided as a central hole in the mouthpiece 6.

The cartridge 20 includes a central bore 9 in which the light guide 16 is partially accommodated within. The light guide 16 is made of an optically transparent material such as glass, which has a refractive index of around 1.5. The light guide 16 is arranged to project below the base 22 of the cartridge 20.

The light guide 16 has a main axis which coincides with the longitudinal axis of the cartridge 20 and the longitudinal axis A of the electronic cigarette 2. The light guide 16 a lower coupling surface 19 which is configured to couple light into the light guide 16 from the laser 14. The end face 18 of the light guide 16 is an upper coupling surface which is configured to couple light towards the absorber 10. The end face 18 of the light guide 16 effectively seals the base of the vaporisation chamber 12 within the cartridge 20. Preferably, the light guide 16 has an elongate cylindrical shape.

The laser 14 is connected to control electronics 21 in the main body 4 that can control its operation. The laser 14 is oriented to emit radiation in a direction that is orthogonal to the longitudinal axis of the electronic cigarette 2.

When the cartridge 20 is to be replaced it can be disconnected from the main body 4. The cartridge 20 can then be removed by hand. A new cartridge 20 or a replenished cartridge 20 can then be inserted in its place. The absorber 10 is integrated within the cartridge 20, together with the light guide 16, so there is no risk of damage being done by one of these components to the other during a replacement operation.

When the cartridge 20 is disassembled from the main body 4 the laser 14 is pointed towards a beam dump 23 that is configured to absorb emitted radiation. If the laser 14 is operated in the absence of any connected cartridge 20 the emitted radiation can be safely absorbed. There is no path that would allow potentially harmful radiation emitted by the laser 14 to be encountered by a user. Hence, the laser 14 is configured to emit light in a direction that is not aligned with the longitudinal axis of the electronic cigarette 2. This advantageously improves safety of the electronic cigarette 2.

When the cartridge 20 is assembled to the main body 4 the light guide 16 is positioned adjacent the laser 14. Radiation emitted by the laser 14 is transmitted through the lower coupling surface 19, which is parallel to the longitudinal axis of the electronic cigarette 2. An angled reflection surface 15 is provided at the lower end of the light guide 16 at an angle of 45 degrees to the longitudinal axis of the electronic cigarette 2. Radiation from the laser 14 is reflected by the angled reflection surface to be re-directed in a direction that is parallel to the longitudinal axis of the electronic cigarette 2. In this way, the light guide 16 can direct radiation emitted by the laser 14 towards the absorber 10. In this sense, the light guide 16 can function as an enabling device adapted to enable propagation of radiation from the laser 14 to the absorber 10 when the cartridge 20 is assembled to the main body 4 and to inhibit propagation of radiation from the laser 14 to the absorber 10 when the cartridge 20 is disassembled from the main body 4.

In use, light is emitted by the laser 14. The laser light is received within the transparent light guide 16 and reflected by the angled reflection surface 15 towards the absorber 10. The absorber 10 absorbs light from the laser 14 and generates heat. Simultaneously the absorber 10 receives vaporisable liquid from the reservoir 8. The liquid in the absorber 10 is vaporised due to the heat generated by the laser light. Vapour generated in the vaporisation chamber 12 is carried in the airflow out of the central vapour outlet 31 in the mouthpiece 6 so that it can be inhaled by a user.

A number of materials may be chosen for use in the absorber 10. In general the material of the absorber 10 is chosen as a radiation absorber for laser light. The laser light can be absorbed by the laser light in the absorber 10 and this can cause heating which vaporises the vaporisable liquid. The vaporisable liquid is generally optically transparent. In one example the absorber 10 is provided as a porous metal disk.

FIG. **3*a* is a cross-sectional view of an electronic cigarette 2 in an aspect of the present disclosure. In this example the laser 14 is oriented to emit radiation in a direction that is parallel to the longitudinal axis of the electronic cigarette 2. The cartridge 20 includes a microchip 40 within its cylindrical receiving portion 36. An antenna 42 is provided in an upper part of the main body 4 adjacent the position of the microchip 40. In this way, the antenna 42 is proximate the microchip 40 when the cartridge 20 is assembled to the main body 4**.

The antenna 42 is connected to the control electronics 21 in the main body 2 which can detect the presence or absence of the microchip 40. In one example the microchip 40 can be embodied as a RFID chip which can be detected by the antenna 42 when it is in close proximity. The control electronics 21 are configured to control emission of radiation by the laser 14. Emission of radiation by the laser 14 is enabled when the antenna 42 detects the presence of the microchip 40, indicating that the cartridge 20 is assembled to the main body 4. Emission of radiation by the laser 14 is disabled when the antenna 42 detects the absence of the microchip 40, indicating that the cartridge 20 is disassembled to the main body 4. In this sense, the antenna 42 and microchip 40 can function as an enabling device adapted to enable propagation of radiation from the laser 14 to the absorber 10 when the cartridge 20 is assembled to the main body 4 and to inhibit propagation of radiation from the laser 14 to the absorber 10 when the cartridge 20 is disassembled from the main body 4. This can improve safety of operation of the electronic cigarette 4 by preventing emission of radiation unless the cartridge 20 has been properly assembled to the main body 4.

The microchip 40 can store authentication information and can communicate this authentication information to the antenna 42 when the two are in close proximity. The control electronics 21 can require communication of satisfactory authentication information before enabling emission of radiation by the laser 14. This can ensure that the main body 4 is only used with authentic cartridges, as verified by the detection of appropriate authentication information by the antenna 42. This can provide a consumer with protection against counterfeit products.

Figure 3B:
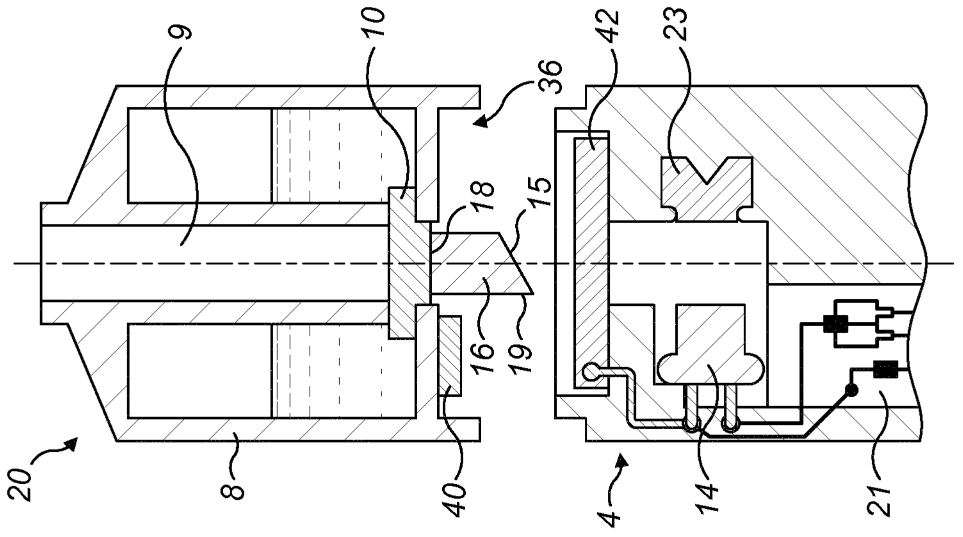
FIG. 3*b* is a cross-sectional view of a cartridge and a main body of an electronic cigarette in another embodiment of the invention.
Figure 3A:
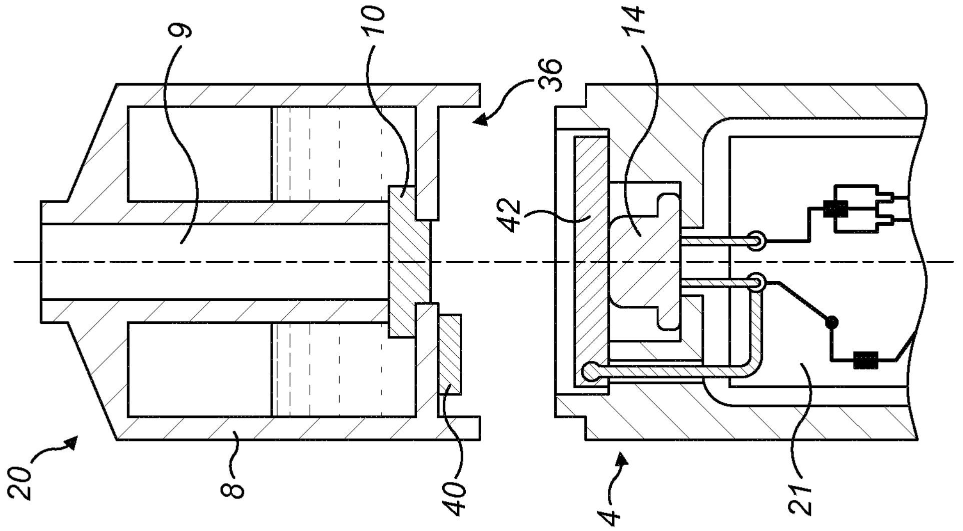
FIG. 3*a* is a cross-sectional view of a cartridge and a main body of an electronic cigarette in an aspect of the present disclosure.

FIG. **3*b* is a cross-sectional view of an electronic cigarette 2 in an embodiment of the present invention. The arrangement in FIG. 3*b* is similar to that of FIG. 3*a* except that the cartridge 20 includes a light guide 16 that is optically coupled to the absorber 10, in a similar way to the embodiment of FIG. 2. The laser 14 is oriented in a direction that is perpendicular to the longitudinal axis of the electronic cigarette 2. When the cartridge 20 is assembled to the main body 4 the light guide 16 extends through a hole in the antenna 42 and is positioned adjacent the laser 14. Radiation emitted by the laser 14 is transmitted through the lower coupling surface 19, which is parallel to the longitudinal axis of the electronic cigarette 2. An angled reflection surface 15 is provided at the lower end of the light guide 16 at an angle of degrees to the longitudinal axis of the electronic cigarette 2. Radiation from the laser 14 is reflected by the angled reflection surface to be re-directed in a direction that is parallel to the longitudinal axis of the electronic cigarette 2. In this way, the light guide 16 can direct radiation emitted by the laser 14 towards the absorber 10. In this sense, the light guide 16 can function as an enabling device adapted to enable propagation of radiation from the laser 14 to the absorber 10 when the cartridge 20 is assembled to the main body 4 and to inhibit propagation of radiation from the laser 14 to the absorber 10 when the cartridge 20 is disassembled from the main body 4**.

In this arrangement the light guide 16 can function as a first enabling device and the antenna 42 and microchip 40 can function as a second enabling device. Propagation of radiation from the laser 14 to the absorber is enabled only when the cartridge 20 is properly assembled to the main body 4 and the conditions of both enabling devices are satisfied.

FIG. **4*a* is a cross-sectional view of an electronic cigarette 2 in an aspect of the present disclosure. In this example the laser 14 is oriented to emit radiation in a direction that is parallel to the longitudinal axis of the electronic cigarette 2. The cartridge 20 includes a permanent magnet 44 within its cylindrical receiving portion 36. A Hall Effect sensor 46 is provided in an upper part of the main body 4 adjacent the position of the magnet 44. In this way, the Hall Effect sensor 46 is proximate the magnet 44 when the cartridge 20 is assembled to the main body 4**.

The Hall Effect sensor 46 is connected to the control electronics 21 in the main body 2 which can detect the presence or absence of the magnet 44. Emission of radiation by the laser 14 is enabled by the control electronics 21 when the Hall Effect sensor 46 detects the presence of the magnet 44, indicating that the cartridge 20 is assembled to the main body 4. Emission of radiation by the laser 14 is disabled when the Hall Effect sensor 46 indicates the absence of the magnet 44, indicating that the cartridge 20 is disassembled to the main body 4. In this sense, the Hall Effect sensor 46 and the magnet 44 can function as an enabling device adapted to enable propagation of radiation from the laser 14 to the absorber 10 when the cartridge 20 is assembled to the main body 4 and to inhibit propagation of radiation from the laser 14 to the absorber 10 when the cartridge 20 is disassembled from the main body 4.

Figure 4B:
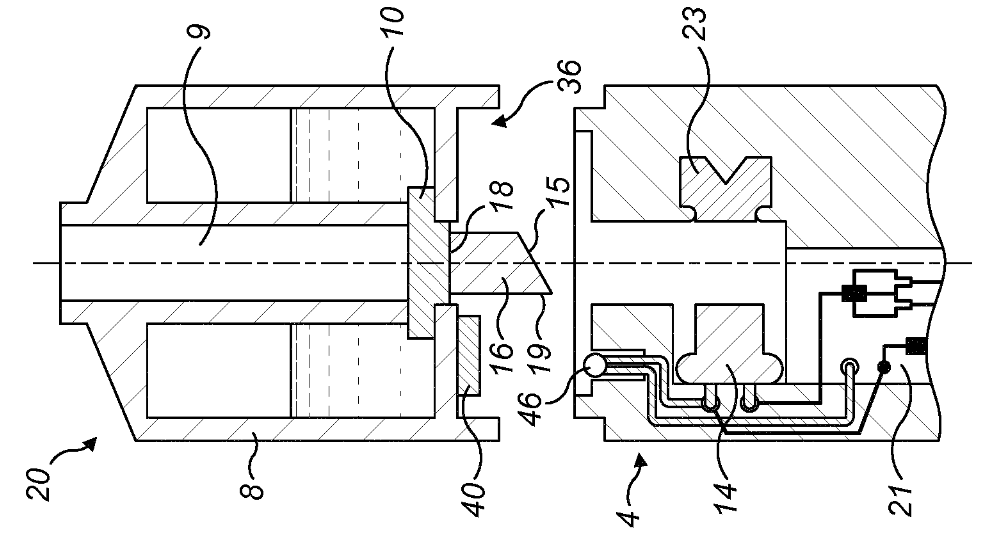
FIG. 4*b* is a cross-sectional view of a cartridge and a main body of an electronic cigarette in another embodiment of the invention.
Figure 4A:
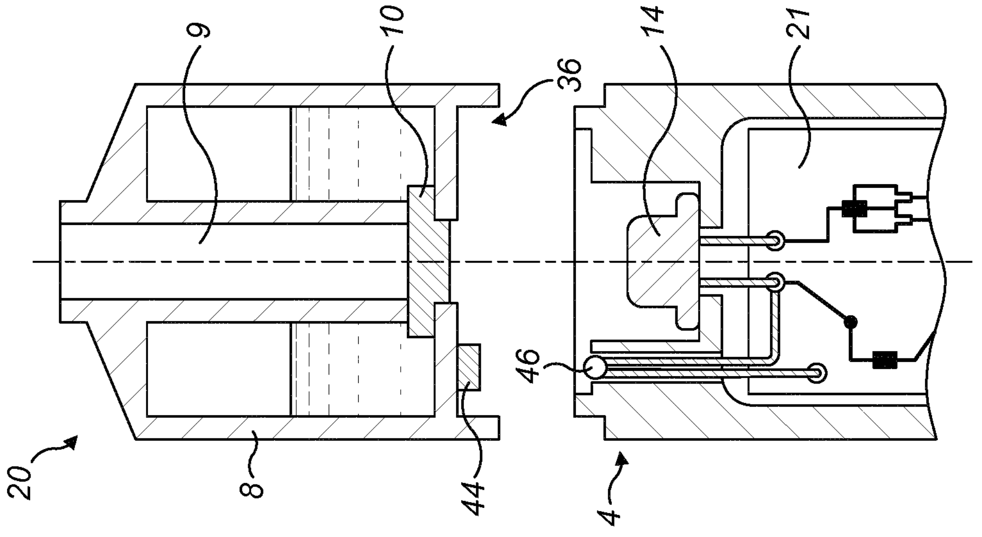
FIG. 4*a* is a cross-sectional view of a cartridge and a main body of an electronic cigarette in an aspect of the present disclosure.

FIG. 4*b* is a cross-sectional view of an electronic cigarette 2 in an embodiment of the present invention. The arrangement in FIG. 4*b* is similar to that of FIG. 4*a* except that the cartridge 20 includes a light guide 16 that is optically coupled to the absorber 10, in a similar way to the embodiment of FIG. 2.

Figure 5B:
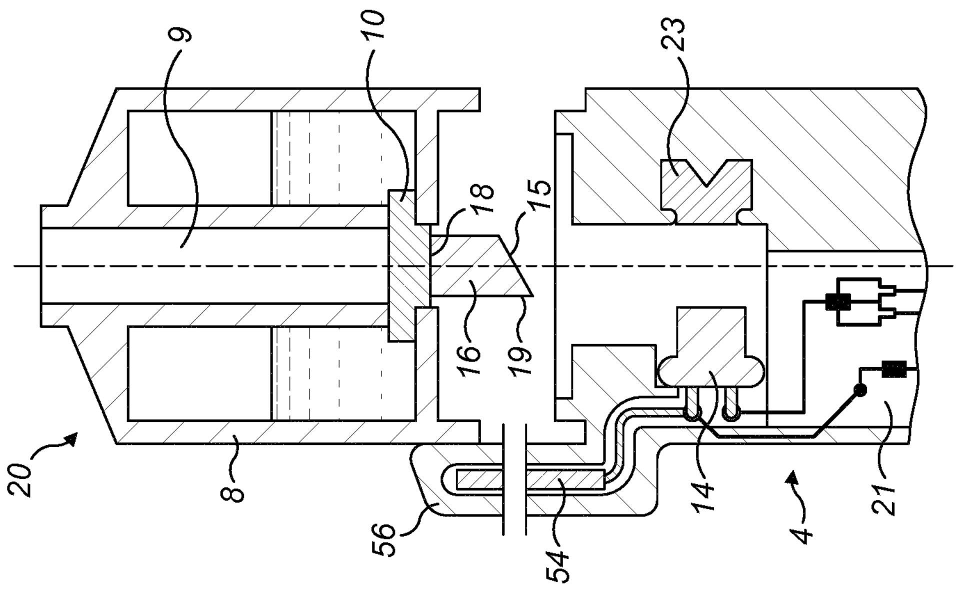
FIG. 5*b* is a cross-sectional view of a cartridge and a main body of an electronic cigarette in another embodiment of the invention.
Figure 5A:
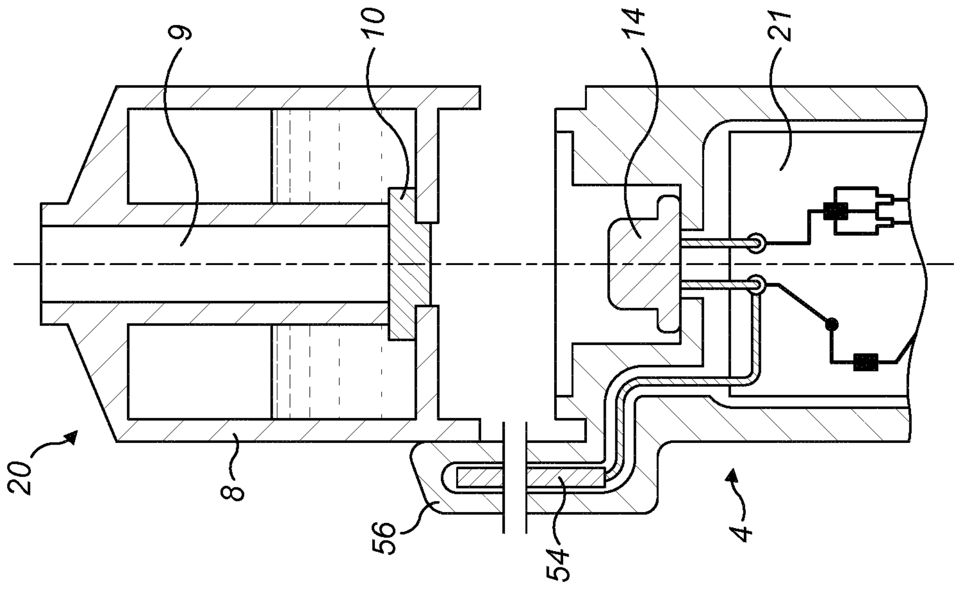
FIG. 5*a* is a cross-sectional view of a cartridge and a main body of an electronic cigarette in an aspect of the present disclosure.

FIG. 5*a* is a cross-sectional view of an electronic cigarette 2 in an aspect of the present disclosure. The embodiment of FIG. 5*a* is similar to that of FIG. 4*a* except that a capacitive sensor 54 is provided in place of the Hall Effect sensor 46, and a capacitive target 56 is provided in place of the magnet 44. The capacitive sensor 54 is connected to the control electronics 21 in the main body 2 which can detect the presence or absence of the capacitive target 56, based on its proximity.

FIG. 5*b* is a cross-sectional view of an electronic cigarette 2 in an embodiment of the present invention. The arrangement in FIG. 5*b* is similar to that of FIG. 5*a* except that the cartridge 20 includes a light guide 16 that is optically coupled to the absorber 10, in a similar way to the embodiment of FIG. 2.

Figure 6B:
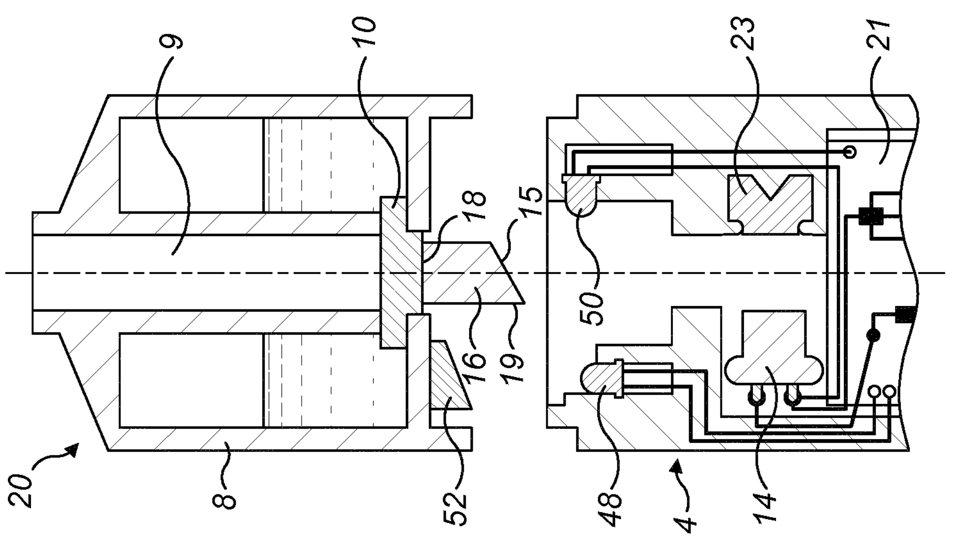
FIG. 6*b* is a cross-sectional view of a cartridge and a main body of an electronic cigarette in another embodiment of the invention.
Figure 6A:
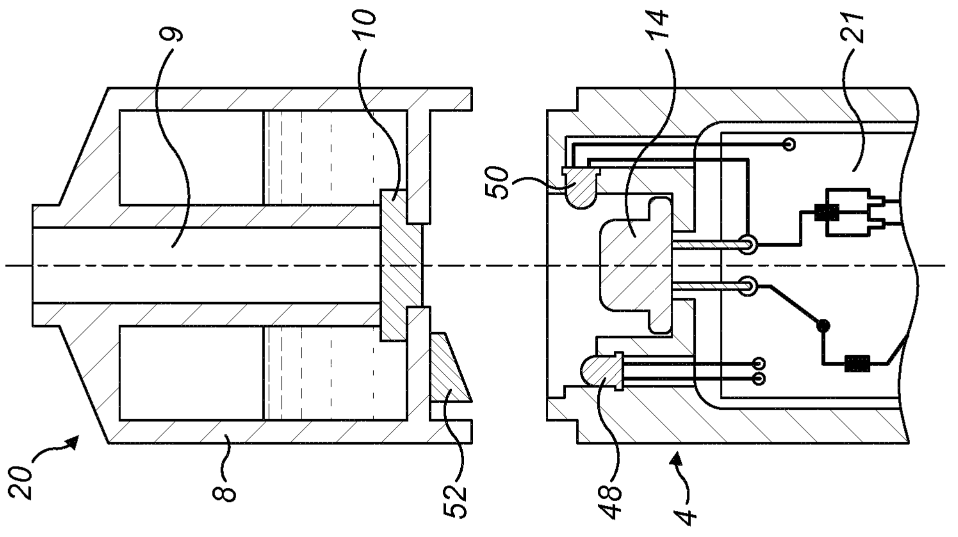
FIG. 6*a* is a cross-sectional view of a cartridge and a main body of an electronic cigarette in an aspect of the present disclosure.

FIG. 6*a* is a cross-sectional view of an electronic cigarette 2 in an aspect of the present disclosure. In this example the laser 14 is oriented to emit radiation in a direction that is parallel to the longitudinal axis of the electronic cigarette 2. An upper part of the main body 4 includes a light source 48 such as a LED 48 configured to project radiation in a direction that is parallel to the longitudinal axis of the electronic cigarette 2. A mirror 52 is provided in the receiving portion 36 of the cartridge 20, positioned so that it reflects light emitted by the LED towards a photodiode 50 in the main body 4.

Emission of radiation by the laser 14 is enabled by the control electronics 21 when the photodiode 50 detects the presence of the light emitted by the LED 48 when it is reflected by the mirror 52, indicating that the cartridge 20 is assembled to the main body 4. Emission of radiation by the laser 14 is disabled when the photodiode 50 does not detect light emitted by the LED 48, indicating that the cartridge 20 is disassembled to the main body 4. In this sense, the LED 48, the mirror 52 and the photodiode 50 can function as an enabling device adapted to enable propagation of radiation from the laser 14 to the absorber 10 when the cartridge 20 is assembled to the main body 4 and to inhibit propagation of radiation from the laser 14 to the absorber 10 when the cartridge 20 is disassembled from the main body 4. The LED 48 and the photodiode 50 can be selectively enabled only upon activation on the electronic cigarette 2. By only activating the LED 48 and the photodiode 50 upon activation, the enabling device is only consuming battery power for a short period of time.

In another configuration the enabling device may simply include the photodiode 50. The photodiode 50 may be enclosed within a dark space when the cartridge 20 is assembled to the main body 4. Conversely the photodiode 50 may detect ambient light when the cartridge 20 is disassembled. The control electronics 21 may use these inputs to provide suitable control of the laser 14, enabling emission only when the photodiode 50 detects an absence of ambient light.

Authentication information may be provided by the cartridge 20 in this embodiment, encoded within an optical code. In one arrangement the mirror 52 may be adapted to reflect and modulate light from the LED 48. The modulation to the reflected light can include the authentication information which can then be detected at the photodiode 50. This may be used by the control electronics 21 to ensure that the main body 4 is used only with authentic cartridges 20. In an alternative arrangement the optical code may be provided as a barcode or a QR code.

FIG. 6*b* is a cross-sectional view of an electronic cigarette 2 in an embodiment of the present invention. The arrangement in FIG. 6*b* is similar to that of FIG. 6*a* except that the cartridge 20 includes a light guide 16 that is optically coupled to the absorber 10, in a similar way to the embodiment of FIG. 2. The light guide 16 is positioned so that it does not interfere with the light path between the photodiode 50 and the LED 48.

Figure 7B:
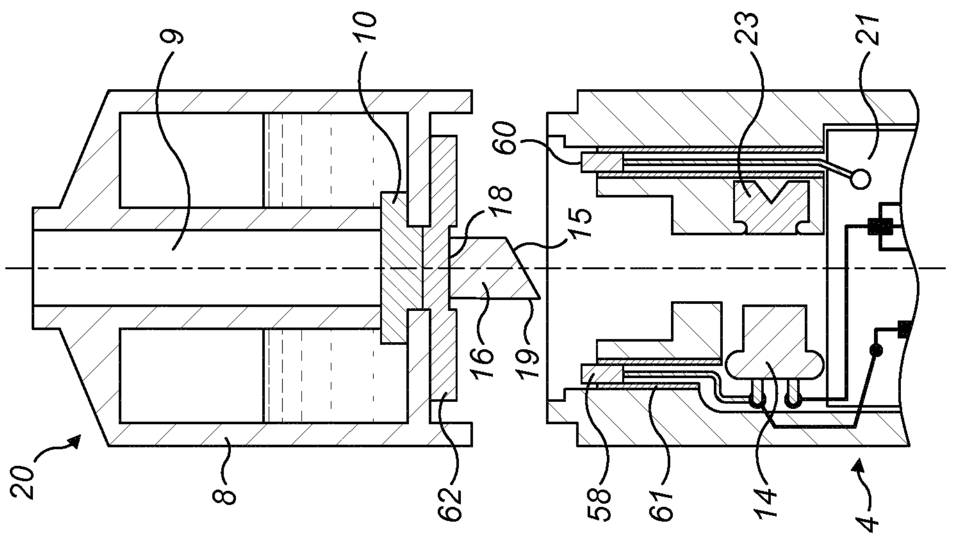
FIG. 7*b* is a cross-sectional view of a cartridge and a main body of an electronic cigarette in another embodiment of the invention.
Figure 7A:
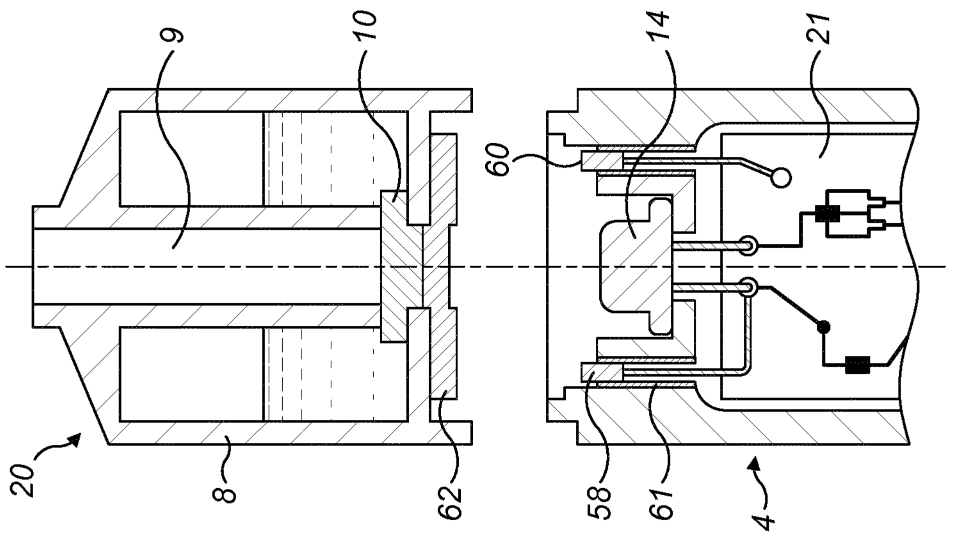
FIG. 7*a* is a cross-sectional view of a cartridge and a main body of an electronic cigarette in an aspect of the present disclosure.

FIG. 7*a* is a cross-sectional view of an electronic cigarette 2 in an aspect of the present disclosure. In this arrangement a pair of electrical contact pins 58, 60 are provided in an upper part of the main body 4. Each electrical contact pin 58, 60 is surrounded by isolating material 61 which is an electrical insulator to electrically isolate the pins 58, 60 from the remainder of the main body 4. The cartridge 20 includes a metal plate 62 which is electrically conducting. The electrical pins 58, 60 provide open contacts within a circuit that is connected to the control electronics 21. The metal plate 62 closes the circuit by providing an electrical connection between the electrical pins 58, 60 only when the cartridge 20 is assembled to the main body 4. The electrical pins 58, 60 and the metal plate 62 may be considered as components of an electrical switch that is closed when the cartridge 20 is assembled to the main body 4 and is open otherwise. The control electronics 21 can sense whether the switch is open or closed and can use this to control emission of radiation by the laser 14.

Emission of radiation by the laser 14 is enabled by the control electronics 21 when the switch is closed and the metal plate 62 connects the electrical contacts 58, 60 together, indicating that the cartridge 20 is assembled to the main body 4. Emission of radiation by the laser 14 is disabled when the switch is open, indicating that the cartridge 20 is disassembled to the main body 4. In this sense, the electrical contacts 58, 60 and the metal plate 62 can function as an enabling device adapted to enable propagation of radiation from the laser 14 to the absorber 10 when the cartridge 20 is assembled to the main body 4 and to inhibit propagation of radiation from the laser 14 to the absorber 10 when the cartridge 20 is disassembled from the main body 4.

In another embodiment the enabling device may be configured to enable propagation of radiation from the laser 14 to the absorber 10 when an electrical switch is open, and to inhibit propagation of radiation from the laser 14 to the absorber 10 when an electrical switch is closed.

The metal plate 62 may be connected to the absorber 10 so that the absorber 10 forms part of the electrical circuit. The conductivity of the electrical circuit may be related to the amount of liquid in the absorber 10. In this way, the control electronics 21 can monitor current flowing in the electrical circuit as an indirect sensor for measuring the amount of liquid remaining in the liquid store 8.

The electrical circuit may also include a temperature sensing element (not shown) that can monitor the temperature of the absorber 10. This can be used in the control electronics 21 to control the amount of radiation emitted by the laser 14 and the amount of heating provided to the absorber 10. This can advantageously prevent over heating or burning of the absorber 10. This may also provide indirect measurement of the amount of liquid remaining in the liquid store 8 since over heating may be indicative of an absence of cooling effect that would normally be provided by the vaporisable liquid.

FIG. 7*b* is a cross-sectional view of an electronic cigarette 2 in an embodiment of the present invention. The arrangement in FIG. 7*b* is similar to that of FIG. 7*a* except that the cartridge 20 includes a light guide 16 that is optically coupled to the absorber 10, in a similar way to the embodiment of FIG. 2. The light guide 16 extends through the metal pate 62.

Figure 8:
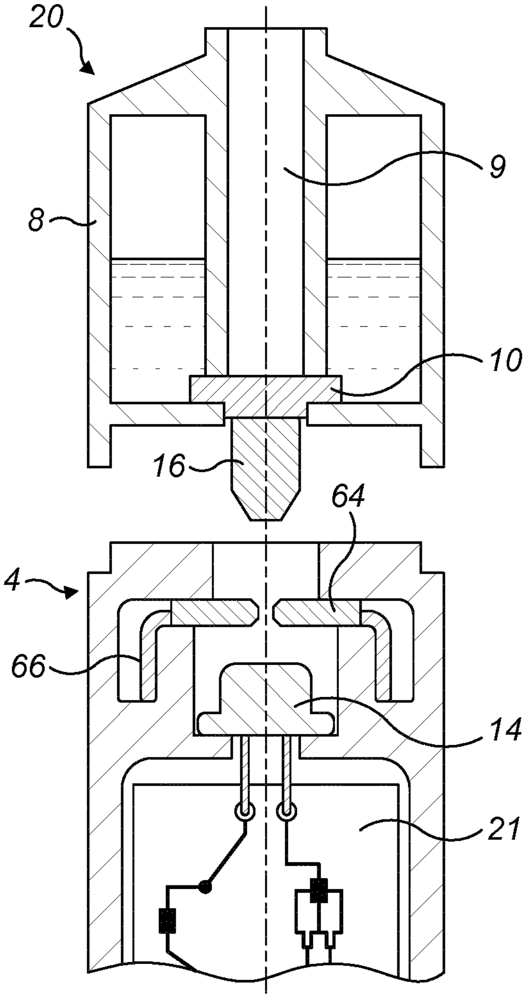
FIG. 8 is a cross-sectional view of a cartridge and a main body of an electronic cigarette in another embodiment of the invention.

FIG. 8 is a cross-sectional view of an electronic cigarette 2 in another embodiment of the invention. In this example the laser 14 is oriented to emit radiation in a direction that is parallel to the longitudinal axis of the electronic cigarette 2. A gate 64 is provided adjacent the laser 14. A leaf spring 66 is connected to the gate 64 and the spring 66 biases the gate 64 to a closed position. In the closed position the gate 64 substantially covers the output from the laser 14 in order to shield the absorber 10 from radiation emitted. Thus, when the cartridge 20 is disassembled from the main body 4 the gate 64 is configured to cover the laser 14 so that a user is shielded from potentially harmful radiation.

The light guide 16 in this embodiment has a tapered lower end. When the cartridge 20 is assembled to the main body 4, the tapered lower end of the light guide 16 engages with a gap in the gate 64 in order to move two sides of the gate 64 laterally into an open position. In the open position the tapered lower end of the light guide 16 is positioned adjacent the output from the laser 14 in order to couple radiation emitted by the laser 14 towards the absorber 10. In this sense, the light guide 16 and the gate 64 can function as an enabling device adapted to enable propagation of radiation from the laser 14 to the absorber 10 when the cartridge 20 is assembled to the main body 4 and to inhibit propagation of radiation from the laser 14 to the absorber 10 when the cartridge 20 is disassembled from the main body 4.

In an alternative arrangement the gate 64 may include tapered edges that can be engaged by features of the light guide 16. In both arrangements it is desirable that the gate 64 is moved to an open position as the light guide 16 is moved axially along the longitudinal axis of the electronic cigarette 2 while the cartridge 20 is being assembled to the main body 4.

The features of any of the embodiments described above may be combined with the features of any other embodiment, in any combination as would naturally occur to a person skilled in the art.

The invention claimed is:

1. An electronic cigarette comprising:

a main body comprising a vaporising light source;

a cartridge configured to be removably assembled to the main body, wherein the cartridge includes a liquid store for storing a vaporisable medium and an absorber configured to be heated by radiation emitted by the vaporising light source in order to vaporise the vaporisable medium; and an enabling device adapted to enable propagation of radiation from the vaporising light source to the absorber only when the cartridge is assembled to the main body, such that the vaporising light source cannot propagate light outside the electronic cigarette when the cartridge is disassembled from the main body, and wherein the enabling device comprises a light guide connected to the cartridge, wherein, when the main body and the cartridge are assembled together the light guide is positioned to direct radiation emitted by the vaporising light source towards the absorber.

2. The electronic cigarette of claim 1, wherein the vaporising light source is oriented away from the absorber and the light guide comprises a surface that reflects radiation emitted by the vaporising light source towards the absorber.

3. The electronic cigarette of claim 1, wherein the vaporising light source is oriented in order to emit radiation in a direction that is transverse to a longitudinal axis of the electronic cigarette.

4. The electronic cigarette of claim 1, wherein the enabling device further comprises a sensor, mounted in the main body, configured to detect the presence of the cartridge when it is assembled to the main body, and wherein the enabling device further comprises control electronics configured to enable or inhibit emission of radiation by the vaporising light source based on a signal received from the sensor.

5. The electronic cigarette of claim 4, wherein the cartridge comprises encoded authentication information that can be read by the sensor when the cartridge is assembled to the main body, wherein the control electronics are configured to authenticate the encoded authentication information thereby to enable or inhibit emission of radiation by the vaporising light source.

6. The electronic cigarette of claim 4, wherein the sensor is an optical sensor configured to detect the presence or absence of the cartridge.

7. The electronic cigarette of claim 6, wherein the main body includes a sensing light source and a light detector, wherein light emitted by the sensing light source is only directed towards the light detector when the cartridge is assembled to the main body and wherein light from the sensing light source is directed away from the light detector when the cartridge is disassembled from the main body.

8. The electronic cigarette of claim 4, wherein the sensor is one of a capacitive sensor, an antenna or a Hall Effect sensor, configured to detect the presence or absence of a corresponding component on the cartridge.

9. The electronic cigarette of claim 4, wherein the sensor comprises an electrical circuit which is rendered open or closed depending on whether the main body is assembled to the cartridge or disassembled from the cartridge.

10. The electronic cigarette of claim 1, wherein the enabling device further comprises a gate positioned in the main body, wherein the gate is configured to open when the cartridge is assembled to the main body and to close when the cartridge is disassembled from the main body, wherein the closed gate is positioned in order to block propagation of radiation from the vaporising light source to the absorber.

11. The electronic cigarette of claim 10, wherein the gate is configured to be opened by the light guide that is connected to the cartridge.

12. The electronic cigarette of claim 1, wherein the vaporising light source is a laser.

13. A cartridge for use in an electronic cigarette comprising:

a liquid store;

an absorber configured to be heated by radiation emitted by a vaporising light source in a main body of the electronic cigarette in order to vaporise a vaporisable medium; and an enabling device adapted to enable propagation of radiation from the vaporising light source to the absorber when the cartridge is assembled to the main body and to inhibit propagation of radiation from the vaporising light source to the absorber when the cartridge is disassembled from the main body, wherein the enabling device comprises a light guide, the light guide having a light input surface configured to be optically coupled with a light emitter and an output surface configured to be optically coupled with the absorber.

14. The cartridge according to claim 13, wherein the light input surface has a tapered angle.

15. An electronic cigarette main body comprising:

a vaporising light source configured to emit radiation towards an absorber in a cartridge in order to vaporise a vaporisable medium; and an enabling device adapted to enable propagation of radiation from the vaporising light source to the absorber when the cartridge is assembled to the main body and to inhibit propagation of radiation from the vaporising light source to the absorber when the cartridge is disassembled from the main body.

16. The electronic cigarette main body according to claim 15, wherein the enabling device comprises a light guide.

* * * * *